US011162806B2

(12) United States Patent
Kreifeldt

(10) Patent No.: US 11,162,806 B2
(45) Date of Patent: Nov. 2, 2021

(54) LEARNING AND PREDICTIVE NAVIGATION SYSTEM

(71) Applicant: Harman International Industries, Incorporated, Stamford, CT (US)

(72) Inventor: Richard Allen Kreifeldt, South Jordan, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 481 days.

(21) Appl. No.: 14/998,382

(22) Filed: Dec. 23, 2015

(65) Prior Publication Data

US 2016/0195405 A1 Jul. 7, 2016

Related U.S. Application Data

(60) Provisional application No. 62/099,986, filed on Jan. 5, 2015.

(51) Int. Cl.
*G01C 21/34* (2006.01)
*G01C 21/36* (2006.01)

(52) U.S. Cl.
CPC ..... *G01C 21/3484* (2013.01); *G01C 21/3617* (2013.01)

(58) Field of Classification Search
CPC ........................ G01C 21/3484; G01C 21/6317;
G01C 21/14; G01C 21/28; G01C 21/3476; G01C 21/3492; G01C 21/3605; G01C 21/3611; G01C 21/3641; G01C 21/3685; G01C 22/00
See application file for complete search history.

(56) References Cited

U.S. PATENT DOCUMENTS

| 7,512,487 B1* | 3/2009 | Golding ............. G01C 21/3484 701/424 |
| 2004/0193420 A1 | 9/2004 | Kennewick et al. |
| 2007/0299599 A1 | 12/2007 | Letchner et al. |
| 2009/0150156 A1 | 6/2009 | Kennewick et al. |
| 2012/0035924 A1 | 2/2012 | Jitkoff et al. |
| 2013/0304758 A1 | 11/2013 | Gruber et al. |
| 2013/0322665 A1 | 12/2013 | Bennett et al. |
| 2013/0345961 A1* | 12/2013 | Leader ................... G01C 21/20 701/410 |
| 2014/0278086 A1* | 9/2014 | San Filippo ....... G01C 21/3423 701/527 |
| 2017/0093967 A1* | 3/2017 | Grosz ................. H04L 67/1044 |

FOREIGN PATENT DOCUMENTS

| EP | 2541484 A1 | 1/2013 |
| WO | 2013101045 A1 | 4/2013 |

OTHER PUBLICATIONS

Extended European Search Report Application No. 16150059.0, dated Jun. 7, 2016, 8 pages.

* cited by examiner

*Primary Examiner* — Mathew Franklin Gordon
(74) *Attorney, Agent, or Firm* — Artegis Law Group, LLP

(57) ABSTRACT

Various embodiments provide techniques for performing an operation that includes receiving a request specifying one or more geospatial commands. The operation further includes generating a navigation query based on the one or more geospatial commands and using a user-specific geospatial command model generated based on collected user behavior and feedback. The operation also includes executing the navigation query against a navigation database to determine route and destination information.

20 Claims, 4 Drawing Sheets

LEARNING AND PREDICTIVE NAVIGATION SYSTEM

CROSS-REFERENCE TO RELATED APPLICATIONS

This application claims the benefit of U.S. provisional patent application titled, "LEARNING AND PREDICTIVE NAGIVATION SYSTEM," filed on Jan. 5, 2015 and having Ser. No. 62/099,986. The subject matter of this related application is hereby incorporated herein by reference.

BACKGROUND

Field of the Embodiments

The present disclosure relates to navigation systems, and more particularly, to a learning and predictive navigation system.

Description of the Related Art

Today navigation devices are recently being used by a great number of people for navigating in populated as well as remote areas. For navigating in populated areas, these devices are usually stored or fixed inside a vehicle, whereas for navigating in remote areas, such as when hiking, these devices are carried on the body or in a backpack. Modern navigation systems for vehicles are often integrated with the vehicle infotainment system and utilize display and audio devices within the vehicle to provide user interfaces. Furthermore, handheld navigation devices frequently come in the form of dedicated navigation devices having a GPS receiver, or multifunctional devices, such as handheld personal computers or mobile devices, which may be extended by additional hardware and software to enable navigation. The multifunctional devices may furthermore include components for outputting audio signals, such as loudspeakers.

Current navigation systems are passive systems that only respond to user queries. Additionally, conventional systems require step-by-step instructions from the user through elaborate interactions which are often unintuitive. This elaborate interaction starts with basic destination entry and continues all the way for traffic information, POI selection, alternate route selection or any other functionality. Not only are such interfaces unintuitive but frequently they are time consuming as well, which is particularly a problem for vehicular systems where the user may be driving and thus may have limited ability to interface with the navigation system. Moreover, these systems are not capable of proactively suggesting optimized, alternate routes to the user in response to real-time changes in road conditions. For example, conventional systems are unable to warn users of a traffic incident in real-time or to dynamically update the current route to take small diversions to avoid the incident.

SUMMARY

Embodiments of the present disclosure provide a non-transitory computer-readable medium containing computer code that, when executed, performs an operation. The operation includes receiving one or more geospatial commands. The operation further includes generating, by operation of one or more computer processors, a navigation query based on at least one of the one or more geospatial commands and a user-specific geospatial command model. The operation also includes executing the navigation query to determine route and destination information.

Further embodiments provide a navigation device that includes a memory that includes a navigation component, and a processor that is coupled to the memory and, upon executing the navigation component, is configured to perform an operation. The operation includes identifying one or more geospatial commands. The operation further includes generating a navigation query based on the one or more geospatial commands and using a user-specific geospatial command model generated based on collected user behavior and feedback data. The operation further includes execute the navigation query against a navigation database to determine route and destination information.

Yet further embodiments provide a method that includes receiving one or more geospatial commands. The method further includes generating, by operation of one or more computer processors, a navigation query based on at least one of the one or more geospatial commands and a user-specific geospatial command model. The method further includes executing the navigation query to determine route and destination information.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

Figure 1:
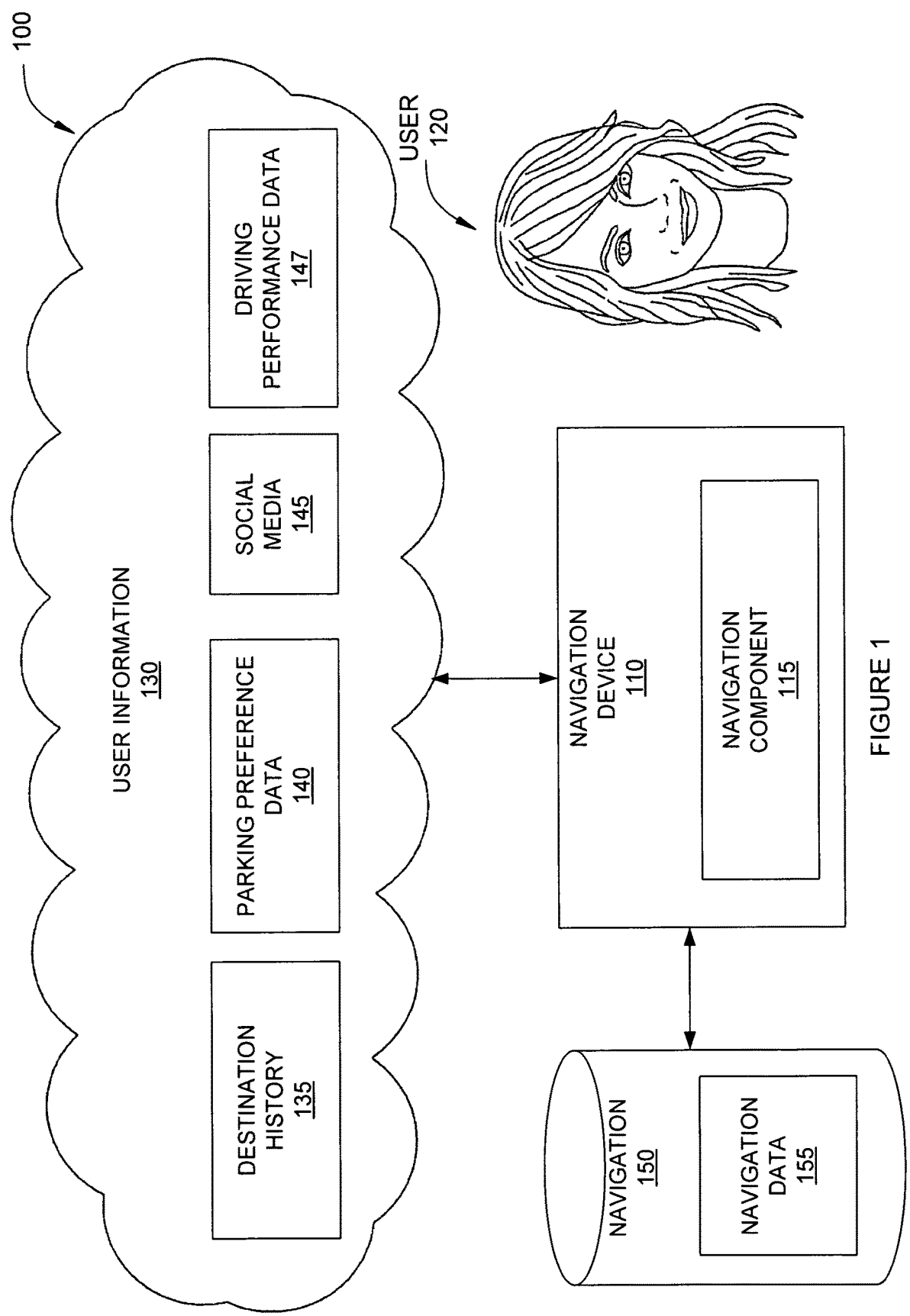
FIG. 1 is a diagram illustrating a navigation system configured to implement one or more aspects of the present disclosure.

FIG. 1 is a diagram illustrating a navigation system 100 configured to implement one or more aspects of the present disclosure. As shown, the navigation system 100 includes, without limitation, a navigation device 110, a database 150 and user information 130. The navigation device 110 is shown as configured with a navigation component 115. Generally, the navigation component 115 is configured to provide navigation services for a user 120. Additionally, the database 150 contains navigation data 155, which generally describes map information for a physical location and POI information within the physical location. For example, and without limitation, the navigation data 155 could include map information representing the roads within a city, speed limits for each of the roads, intersection information pertaining to the roads (e.g., stop signs, stop lights, etc.), real-time traffic information for the roads, event information for the roads (e.g., construction information, social event information, etc.), public transportation routes and schedules, and so on. Additionally, the navigation data 155 could specify POI information representing various businesses within the physical location, types of the business, services offered by the businesses (e.g., valet parking), hours of operation for the businesses and so on.

The user information 130 includes a destination history 135 for the user 120, parking preference data 140 for the user 120, social media data 145 for the user 120 and driving preference data 147 for the user 120. The destination history 135 generally represents destinations to which the user 120 is known to have previously travelled (e.g., based on previous trips taken using the navigation device 110, based on check-in information posted by the user, etc.). The parking preference data 140 generally represents the user's 120 parking preferences. Such parking preference data 140 could be learned, for instance, by monitoring the user's GPS coordinates and behavior. As an example, and without limitation, if the user frequently arrives at the destination (e.g., a restaurant), pauses briefly at the front door, and then begins travelling again to a nearby parking location, the navigation component 115 could determine that the user 120 has used valet parking and could update the parking preference data 140 accordingly. Additionally, the parking preference data 140 could be learned based on the user's behavior with respect to the navigation device 110. For instance, if the user frequently searches for parking garages as a destination, the navigation component 115 could update the parking preference data 140 to indicate that the user 120 has a preference for public parking facilities.

The social media information 145 generally represents the user's interactions on one or more social media sites. For instance, if the user has favorite or liked a particular chain of coffee shops on a social media site, the navigation component 115 could determine that the user has a preference for the particular chain of coffee shops and could use this preference information to predictively suggest destinations for the user 120. As an example, and without limitation, if the user submits the query of "route me to a coffee shop within walking distance of the library" and the navigation component 115 determines that there are two or more coffee shops within the user's 120 personalized walking distance from the library, the navigation component 115 could give a preference to the closest coffee shop belonging to the particular chain of coffee shops when predictively selecting a destination for the user.

The driving preference data 147 generally represents the user's driving behavior. For instance, the navigation component 115 could monitor the user's driving behavior and could determine that the user frequently avoids interstate highways in favor of state and local roads. In predictively creating future routes for the user 120, the navigation component 115 could take this driving preference data into account. For example, and without limitation, if the navigation component 115 determines the user 120 has a preference for state and local roads, the navigation component 115 can select state and local roads wherever feasible in creating future routes for the user.

As discussed above, the navigation component 115 can generally maintain a geospatial command model for the user 120 which represents the user's intended meaning for various geospatial commands. For instance, the navigation component 115 could monitor the user's feedback and behavior to determine an individualized meaning for the term "near" for the user 120. As an example, and without limitation, if the user 120 frequently walks numerous miles in a day, the navigation component 115 could determine that the geospatial command "near" means a greater distance for the user 120, relative to another user who walks less than a mile most days. As another example, and without limitation, if the user 120 frequently provides feedback indicating that parking suggestions selected by the navigation component 115 are too far away, the navigation component 115 could reduce the distance corresponding to the geospatial command "near." The navigation component 115 can then use the geospatial command model to generate queries for the navigation data 155 in the database 150 to select a destination for the user. By monitoring the user's behavior and feedback and consistently refining the geospatial command model, the navigation component 115 can more accurately ascertain the user's 120 intended meaning for the various geospatial commands, thereby allowing the user 120 to effectively use geospatial commands in queries and improving the interface of the navigation device 110.

Additionally, the navigation component 115 can use the user information 130 such as parking preference data 140 in predictively generating routes for the user. For instance, the navigation component 115 could analyze the query of "route me to a coffee shop within walking distance of the library" and could determine the coffee shop which the user intends as the destination. The navigation component 115 could then use the parking preference data 140 to generate a query for the navigation data 155 in the database 150 in order to determine a driving destination for the user. For instance, the navigation component 115 could search the navigation data 155 to determine that the coffee shop does not have its own parking lot. The navigation component 115 could the search the navigation data 155 using the parking preference data 140 for the user to select a parking option that best matches the user's preferences. As an example, and without limitation, if the navigation component 115 determines that the user has a preference for public parking facilities, the navigation component 115 could route the user to the public parking facility nearest the coffee shop. In doing so, the navigation component 115 can also take into account other learned information for the user, such as a maximum distance the user has historically been willing to walk for parking (or, e.g., the maximum distance users generally are willing to walk for parking). If the navigation component 115 determines that no public parking facilities are within the determined distance, the navigation component 115 could access the parking preference data 140 for the user 120 to determine the user's second best preference for parking. Continuing the example, and without limitation, if the navigation component 115 determines that no public parking facilities are available within a determined distance from the coffee shop, the navigation component 115 could determine that the user's 120 second best preference for parking is street parking by accessing the parking preference data 140. The navigation component 115 could then query the navigation data 155 in the database 150 to determine a location nearest to the coffee shop where street parking is available and could route the user to the determined location.

Additionally, the navigation component 115 is generally configured to maintain the user information 130 by monitoring the user's behavior and feedback. For example, and without limitation, the navigation component 115 could record data representing various routes driven by the user 120, as well as time of the day, day of the week, etc. at which these routes were driven, diversions taken by the user while driving various routes, locations and POIs visited, time spent visiting each location and POI, and so on. For instance, the navigation component 115 can interact with vehicle sensors (e.g., timers, GPS, gyro sensors, etc.) to gather the data 130. The navigation component 115 may also interact with a "Contacts Database" module in the navigation device 110 to gather information on contact names, addresses, social networking site information, etc. if permitted by the user. The navigation component 115 may, as well, interact with user's mobile device to gather more inputs on user characteristics, if required.

Additionally, the navigation component 115 can access traffic and weather information received by the navigation device 110 for use in planning routes for the user 120. In the event the navigation device 110 does not have access to such traffic and/or weather information, the navigation component 115 may interact with a remote server (e.g., via a network connection of the navigation device 110, via a network connection established using a mobile device in communication with the navigation device 110, etc.) to gather such information.

For the first time use, the navigation component 115 may request that the user 120 input specific personal information for use as training data for populating the user information 130. Such personal information could include, for example, and without limitation, the user's home address, the user's office address, school addresses for the user's children, and so on. The navigation component 115 could use this data to create the initial driver's profile and an initial geospatial command model for the user. The navigation component 115 could also receive historical driving and destination information from the navigation device 110, describing previous destinations visited by the user and previous routes taken by the user, for use in improving the driver's profile information and geospatial command model. Additionally, the navigation component 115 could collect additional input by monitoring the user's behavior and feedback in order to refine the driver's profile and geospatial command model.

In various embodiments, the navigation component 115 on the navigation device 110 is configured to interact with a remote server to refine the driver's profile and geospatial command model for the user 120. For example, and without limitation, the navigation component 115 could monitor the user's behavior and feedback and could transmit data describing the user's behavior and feedback to the remote server as a network connection becomes available. Such a network connection could be provided, for example, and without limitation, by a network adapter of the navigation device 110, by communicating with a mobile device to utilize the device's network connection, and so on. The remote server could then analyze the data to refine a centralized user profile and geospatial command model for the user 120. The remote server could also pull information from other sources, such as social networking sites visited by the user and other preference information for the user. The navigation component 115 could then update the user profile and geospatial command model on the navigation device 110, as network connectivity becomes available. Doing so allows for much of the processing involved in creating and maintaining the user profile and geospatial command model to be offloaded from the navigation device 110 to a remote server better equipped to perform complex data analytics operations on the user information 130 (e.g., a server hosted in a cloud computing environment).

Additionally, the navigation component 115 (or a navigation component hosted on a remote server and in communication with the navigation component 115 on the navigation device 110) could maintain information on a plurality of affinity groups for use in refining the user's profile information and geospatial command model.

While conventional navigation systems are capable of routing a user to a destination's physical location (e.g., as specified by GPS coordinates), such techniques are not always optimal in practice. For example, and without limitation, while conventional navigation systems are capable of routing a user to coordinates corresponding to a point of interest (POI), such systems are not capable of taking individual user preferences into account when determining the optimal destination for the route. As an example, and without limitation, a particular user could frequently use public parking garages when visiting POI's in a particular region. By routing the user directly to the coordinates of the current POI, conventional navigation systems put the burden on the user to identify public parking garages within the particular region upon reaching the current POI. This is particularly problematic when the user is not familiar with the area around the current POI.

As such, embodiments provide techniques for determining an optimal destination for a user by learning and taking into account the user's navigational preferences and based on user input specifying one or more geospatial commands. Generally, embodiments can learn the particular user's navigational behavior and personal preferences and can use this information to interpret navigational commands from the user. For instance, embodiments can monitor the user's behavior and feedback to model the user's frequent destinations, driving habits (e.g., where is the driver likely to go on a specific day of week, time of day, etc.), parking preferences (e.g., valet parking, public parking, street parking, etc.), street preferences (e.g., highway, surface, etc.), and so on. Moreover, embodiments can create and maintain a geospatial command model for the user that represents the user-specific intent of geospatial commands (e.g., "near," "walking distance," etc.).

For example, and without limitation, the user could speak the command of "route me to the bookstore near Frank's coffee shop" and logic for the navigation system 100 could determine a destination for the current route based on the user's individual preferences and navigational history. For instance, the logic could identify the user (e.g., using facial recognition techniques and matching one or more pictures that include the user to predefined facial data for the user) and could determine preference information for the user for use in determining the current destination. While the location of "Frank's coffee shop" may be a single location in the event of a unique POI, the logic may need to determine the location from multiple potential locations in the event there are multiple businesses named "Frank's coffee shop" (e.g., where Frank's coffee shop is a franchise). As an example, and without limitation, the logic could analyze historical navigational data for the user and could determine which Frank's coffee shop the user most frequently visits. The logic on the navigation system 100 could further access a voice command model for the user to determine a user-specific meaning for the geospatial command of "near." For instance, the logic could determine that the descriptor "near" means anything less than 10 city blocks for a user who frequently walks several miles every day, while the "near" descriptor means 2 or less city blocks to another user who rarely walks longer distances.

Of course, the example of a bookstore "near" a particular coffee shop is merely one example of a geospatial command and is provided without limitation and for illustrative purposes only. As another example, and without limitation, the user could specify the query of a bookstore "within walking distance" of the particular coffee shop and logic for the navigation system 100 could access a geospatial command model for the user to determine the meaning of "within walking distance" for the particular user.

The logic for the navigation system 100 could create the geospatial command model for the user in various ways. For example, and without limitation, the logic could initially create the geospatial command model using default values for a number of predefined voice commands (e.g., near, within walking distance, behind, next to, etc.) and could refine the default values over time based on provided feedback and monitored behavior of the user. For example, and without limitation, if the navigation system 100 determines a parking location for the user using the user's geospatial command model (e.g., populated with default values, populated with refined values, etc.) and the user indicates that the determined distance is too far away from the destination POI (e.g., by providing audible feedback, feedback through a graphical user interface of the navigation system 100, etc.), the logic could update the geospatial command model to reduce the distance corresponding with the particular geospatial voice command (e.g., "near"), so that subsequent predictions are more likely to satisfy the user.

As another example, and without limitation, the navigation system 100 could consistently provide multiple predicted destinations for the user (e.g., 5 potential parking locations within a determined distance from the specified POI) and could update the geospatial command model based on the user's selection. For instance, assume that the user submits the query of "parking near Frank's coffee shop" and the navigation system 100 presents a number of potential parking facilities to the user. If the user consistently selects a public parking facility less than 4 city blocks from the destination POI, the logic for the navigation system 100 could update the geospatial command model to match the user's behavior (e.g., specifying that the geospatial command of "near" means 4 or fewer city blocks, specifying that the user has a preference for public parking facilities, etc.).

Upon determining the meaning of the geospatial command, the logic could then generate a search query to identify bookstores within the determined distance (i.e., based on the meaning of "near" for the particular user) from the location of the POI with the name "Frank's coffee shop" (e.g., the single location of a unique POI with the name "Frank's coffee shop," a predicted location of a most-visited POI with the name, etc.). In the event only one bookstore is located within the determined distance from the determined location, the logic could create a route to the location of the bookstore. In the event multiple businesses of the bookstore type are located within the determined distance from the determined location, the navigation system 100 logic could select one of the bookstores based on the user's personal preferences and navigational history. For instance, if the user's navigational history data indicates that the user frequently visits a particular bookstore (or chain of bookstores) and the particular bookstore (or a bookstore belonging to the chain of bookstores) are located within the determined distance of the determined location, the logic could predictively select the particular bookstore (or chain bookstore) as the destination for the current route.

As another example, and without limitation, the logic could monitor the user's interactions outside of the navigation system 100 (e.g., on social networking sites) and could consider this information in determining the user's preferences. For example, and without limitation, the logic could determine that the user has "liked" a particular bookstore chain on one or more social networking sites and could give a preference to stores of the particular bookstore chain as a result. Doing so allows users to interact with the navigation system 100 in a more conversational tone and provides a more natural interface for the navigation system 100 that tailors itself towards the user's personal preferences and behavior over time.

Moreover, the logic on the navigation system 100 could consider the user's preferences and historical behavior with respect to parking at the POI or other POIs (e.g., POIs in the same general location, POIs of the same type, etc.). For example, and without limitation, the navigation system 100 could determine historical parking preferences for the user in question and could determine that the user frequently uses public parking facilities (e.g., parking garages) when visiting POIs in the area of the current destination POI, as opposed to other forms of parking (e.g., valet parking, parallel street parking, etc.). The logic for the navigation system 100 could then determine a public parking facility that is closest to the current destination POI and could set the location of the determined public parking facility as the current destination for the navigation system 100. Doing so enables the navigation system 100 to route the user to the proper driving destination (e.g., parking for the specified bookstore), rather than simply routing to the user's ultimate destination (e.g., the bookstore itself).

Of course, while the navigation system 100 could use the geospatial command model to determine that the user intends a public parking garage within 4 city blocks when the user submits the query of "parking near Frank's coffee shop," in practice such a destination may not exist. In such a situation, the logic for the navigation system 100 could determine one or more alternate destinations that best match the user's query. For example, and without limitation, the navigation system 100 could determine that while no destinations match the user's intended request, there is street parking "near" Frank's coffee shop (i.e., within 4 city blocks, in the current example) and there is also a public parking facility within 6 blocks of Frank's coffee shop. Accordingly, the navigation system 100 could present these choices to the user as the best matching choices for the user's submitted query.

Generally, the navigation system 100 logic can user a number of different techniques in identifying the user. For example, and without limitation, the logic could capture pictures of the physical environment using one or more camera devices and could transmit the pictures to a remote server (e.g., via a network connection to the Internet). The remote server could perform a facial recognition analysis on the pictures to identify the user present within the physical environment. The remote server could further access user profiles associated with the identified user to retrieve the geospatial command model for the user. As discussed above, such a model could be formed based on any information relating to a user's navigational history and general preferences, with examples including, and without limitation, previous destinations the user has visited, data describing how often the user visits various locations and types of locations, feedback provided by the user for previously predicted destination, other feedback provided by the user for POIs, and so on.

The remote server could then return the geospatial command model to the navigation system 100 for use in determining a user-specific meaning for one or more geospatial commands. Upon receiving the model, the logic on the navigation system 100 could generate a search query using the geospatial command model and based on the geospatial command string received from the user. For example, and without limitation, if the user submits the command string of "route me to the bookstore near Frank's coffee shop," the logic could access the geospatial command model for the user to determine that the geospatial command "near" means 10 or fewer city blocks to the user in question. The logic could determine the location of "Frank's coffee shop" and could generate a search query to identify bookstores within 10 or fewer city blocks of the determined location.

In addition, the navigation system 100 can model other geospatial commands such as "behind" a particular POI. For example, and without limitation, the user could specify the query of "Route me to the bookstore behind the gas station on $3^{rd}$ and Elm street." In response to receiving such a command, the navigation system 100 could first generate a search query (e.g., to a database storing navigational data) to identify gas stations at the intersection of $3^{rd}$ and Elm street. The navigation system 100 could further submit a query to identify which of the identified gas stations have a POI of the type bookstore positioned behind them, relative to the main thoroughfare. In the event multiple gas stations at the specified intersection have bookstores positioned behind them, the navigation system 100 could consider preference information for the user to select one of the identified bookstores for use as the current destination. Alternatively, the navigation system 100 could present all bookstores matching the user's query to the user (e.g., via a graphical user interface, via an audible user interface, etc.) and could allow the user to select which bookstore should be the destination for the current travel plan.

In addition to using cameras to identify the user through facial recognition techniques, it is broadly contemplated that any number of different identification techniques or combinations of techniques can be used, consistent with the present disclosure. For example, and without limitation, the logic could access identification information (e.g., a media access control (MAC) address) of a mobile device (e.g., a mobile phone, a smart watch, etc.) the user is carrying and could identify the user using this device identification information (e.g., by comparing the identification information to predefined identification information recorded in a user profile). Generally, it is preferable for the logic to access the user device(s) using wireless data communications (e.g., Bluetooth communications, WiFi communications, RFID, etc.), although more generally any communications medium can be used.

The navigation system 100 can also provide real-time updates to the travel plan. For example, and without limitation, the navigation system 100 could predict that the user wishes to travel to his typical coffee shop, based on the user's geospatial command model and preference information, and could further determine that there is currently roadwork being performed on the main thoroughfare near the coffee shop. As such, the navigation system 100 could output a statement such as "There is construction in front of your favorite coffee shop, I can route you to another" and could update the current travel plan accordingly. As another example, and without limitation, while the user is en route to the particular coffee shop, the navigation system 100 could determine that a soccer game is currently letting out along the route to the coffee shop and could output the statement "There is a soccer game, suggest you go east two blocks to avoid the traffic." The navigation system 100 could then update the route for the travel plan to avoid the roads next to the soccer game, thereby avoiding the additional traffic from the soccer game letting out.

As another example, and without limitation, the logic could use biometric sensors within the physical environment. For example, and without limitation, the logic could receive data from a remote heart sensing device specifying heart rate information collected from a user within the physical environment and could correlate the data to prerecorded user heart rate data in one of the user profiles to identify the user. As yet another example, and without limitation, the logic could use data from a remote heat sensing device to determine an approximate body composition and size of a user within the physical environment (e.g., based on the size of the heat signature in the data received from the remote heat sensing device). Generally, while such heat signatures may be too imprecise for identifying specific users, the logic can be configured to employ sensor fusion techniques in identifying the users, where the logic uses data collected from multiple different sensors to perform the user identification. For example, and without limitation, the logic could quickly eliminate certain users from consideration based on the heat signature information (e.g., if the heat signature indicates the detected user is an adult sized individual, the logic could eliminate all user profiles pertaining to children from further consideration in identifying the user). Doing so allows the logic to more accurately and more quickly identify users within the physical environment, as the logic can quickly remove particular user profiles that clearly do not correspond to the detected user from further consideration, thereby avoiding having to perform wasteful facial recognition analysis operations for these user profiles.

Figure 2:
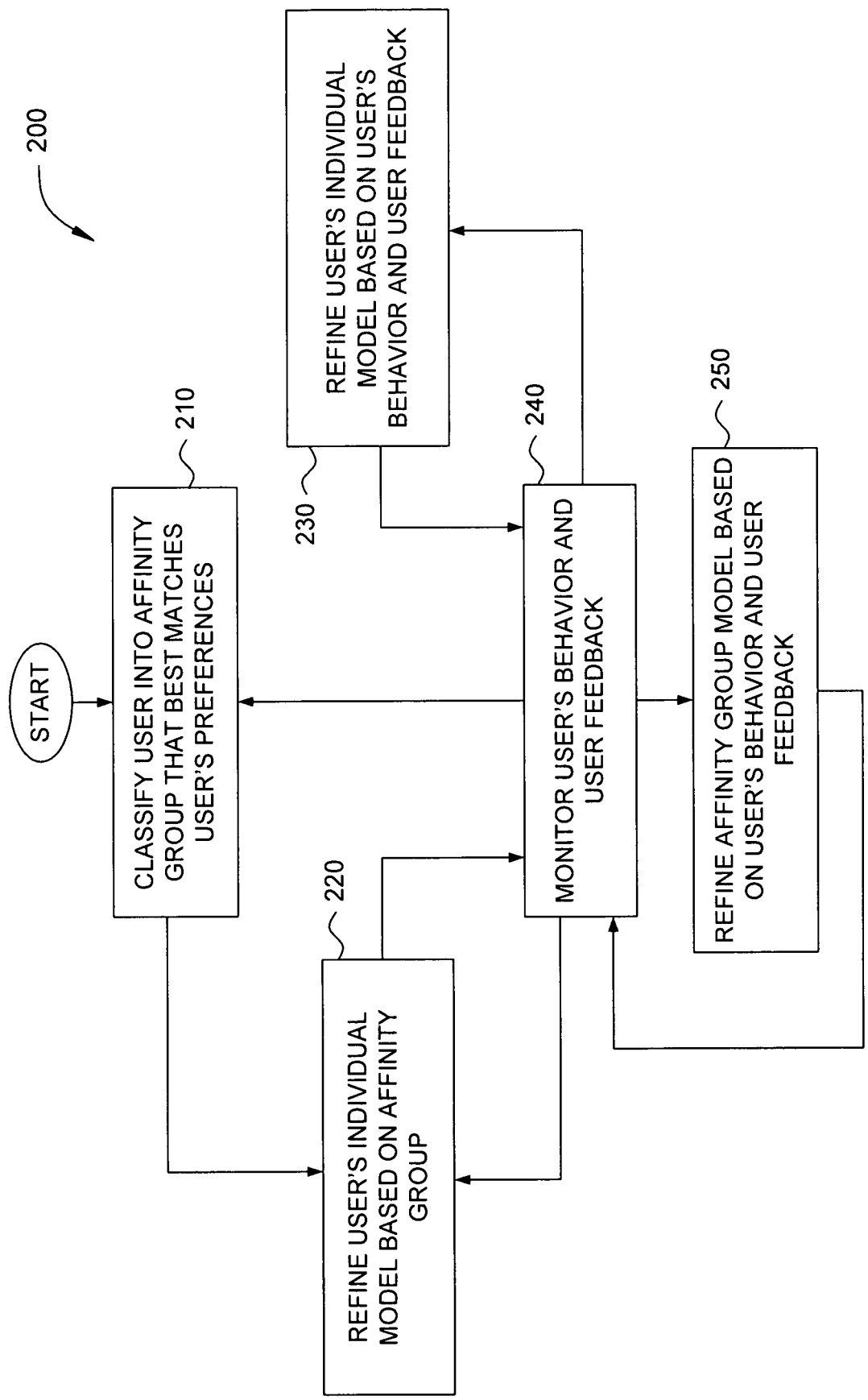
FIG. 2 is a flow diagram of method steps for using affinity groups to refine a model associated with the navigation device of FIG. 1, according to various embodiments.

FIG. 2 is a flow diagram of method steps for using affinity groups to refine a model associated with the navigation 110 device of FIG. 1, according to various embodiments. Although the method steps are described in conjunction with the systems of FIGS. 1 and 4, persons skilled in the art will understand that any system configured to perform the method steps, in any order, is within the scope of the various embodiments.

As shown, a method 200 begins at step 210, where the navigation component 115 classifies a user into an affinity group that best matches the user's preferences. In classifying the user, the navigation component 115 can consider any of the user information 130 as well as metadata describing the user (e.g., the user's age, geolocation, social activities the user participates in, etc.). The navigation component 115 then refines the user's geospatial command model based on the affinity group into which the user was classified (step 220). For instance, the navigation component 115 could maintain a geospatial command model for each affinity group that represents an intended meaning for geospatial commands (e.g., "walking distance," "near," "behind," "next to," etc.) for users of the affinity group. The navigation component 115 can then refine the user's geospatial command model to more closely match the model of the selected affinity group.

The navigation component 115 then monitors the user's behavior and feedback (step 240). The navigation component 115 can use the monitored behavior and feedback information to refine the user's individual geospatial command model (step 230). For instance, if the navigation component 115 determines that the user's intended meaning for the term "near" is a greater distance than is currently specified in the user's geospatial command model, the navigation component 115 could increase the value within the user's geospatial command model accordingly. Additionally, based on the monitored behavior and feedback, the navigation component 115 can further refine the model for the selected affinity group (step 250). For example, and without limitation, if the navigation component 115 determines that the user's intended meaning for the geospatial command of "within walking distance" is a greater distance than is specified by the geospatial command model of the affinity group into which the user is classified, the navigation component 115 could update the affinity group's geospatial command model to increase the distance corresponding to the geospatial command.

In some instances, the navigation component 115 may determine that the monitored user behavior and feedback for the user indicates that the user is no longer classified into the best matching affinity group. Accordingly, the method 200 could return to step 210, where the navigation component 115 reclassifies the user into the affinity group that best matches the user's preferences. The navigation component 115 could then refine the user's individual geospatial command model based on the newly selected affinity group. Doing so enables the navigation component 115 to more accurately model the user's intended meaning for various geospatial commands.

Figure 3:
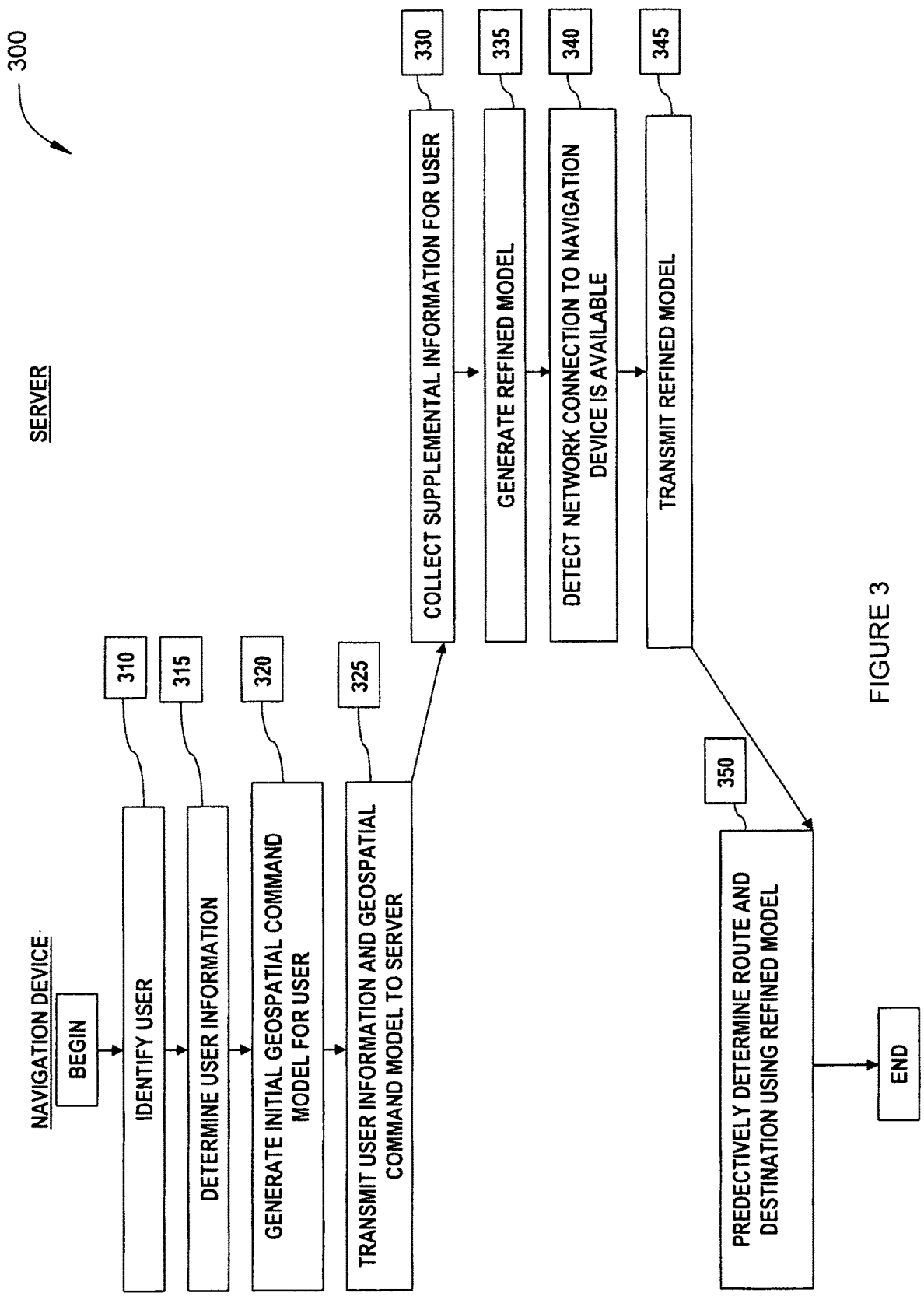
FIG. 3 is a flow diagram of method steps for refining a geospatial command model associated with the navigation device of FIG. 1, according to various embodiments.

FIG. 3 is a flow diagram of method steps for refining a geospatial command model associated with the navigation device 110 of FIG. 1, according to various embodiments. Although the method steps are described in conjunction with the systems of FIGS. 1 and 4, persons skilled in the art will understand that any system configured to perform the method steps, in any order, is within the scope of the various embodiments.

As shown, a method 300 begins at step 310, where the navigation component 115 identifies a user. As discussed above, the user can be identified using a number of different techniques, including user input (e.g., login information), facial recognition, biometric user information and so on. The navigation component 115 then determines user information for the identified user (step 315). Such user information can include, for example, and without limitation, destination history information, parking preference information, social media information, driving preference information and so on. The navigation component 115 generates an initial geospatial command model for the user, using the determined user information (step 320). As discussed above, the geospatial command model generally represents an intended meaning for the user for a plurality of geospatial commands.

At some subsequent point in time (e.g., upon determining a network connection has become available), the navigation component 115 transmits the user information and geospatial command model to a remote server (step 325). For example, and without limitation, the navigation component 115 could transmit the information and model using a network connection established using a network adapter of the navigation device hosting the navigation component 115. As another example, and without limitation, the navigation component 115 on the navigation device could access an API of a user's mobile device and could utilize a network connection of the mobile device to transmit the model to the remote server. More generally, it is broadly contemplated that any suitable network connection could be used to transmit the user information and initial model, consistent with the functionality described herein.

Upon receiving the information and initial geospatial command model, logic on the remote server collects supplemental information for the user (step 330). The logic then uses this supplemental information to generate a refined geospatial command model for the user (step 335). That is, since the user is determined to be similar to the other users in the group in a number of ways, the logic could determine that the particular user may share intended meanings for geospatial commands with the members of the group, and could incorporate such additional intended meaning information into the particular user's individual geospatial command model and user profile. For example, and without limitation, the logic could access social media site information for the user to determine businesses preferences of the user (e.g., a favorite coffee shop of the user). More generally, it is broadly contemplated that the logic can access any supplemental information which reflects the user's driving and personal preferences.

Additionally, the logic could classify the user into an affinity group which best matches the user's preferences and metadata (e.g., using the method 200 shown in FIG. 2 and discussed above). For example, and without limitation, the logic on the remote server (e.g., deployed within a cloud computing environment) could maintain user group information defining groups of users who share common characteristics and interests, and the logic could classify the user into one of these groups. The logic could then refine the user's initiate preference model based on the preferences of the selected group to generate the refined model. For example, and without limitation, the logic could determine that users within the selected affinity group generally have an intended meaning of less than 6 city blocks when using the geospatial command of "within walking distance" and the logic could update the refined geospatial command model accordingly.

At some subsequent point in time, the logic detects a network connection to the navigation device is available (step 340) and transmits the refined model and user profile information to the navigation component 115 on the navigation device 110 (step 345). The navigation component 115 then uses the refined model and user profile information to process user queries that include one or more geospatial commands and to predictively determine route and destination information for the user (step 350), and the method 300 ends. Doing so provides an improved interface for the navigation device through the use of geospatial commands and enables the navigation device to offload complex data analytics processing operations to a remote server.

Figure 4:
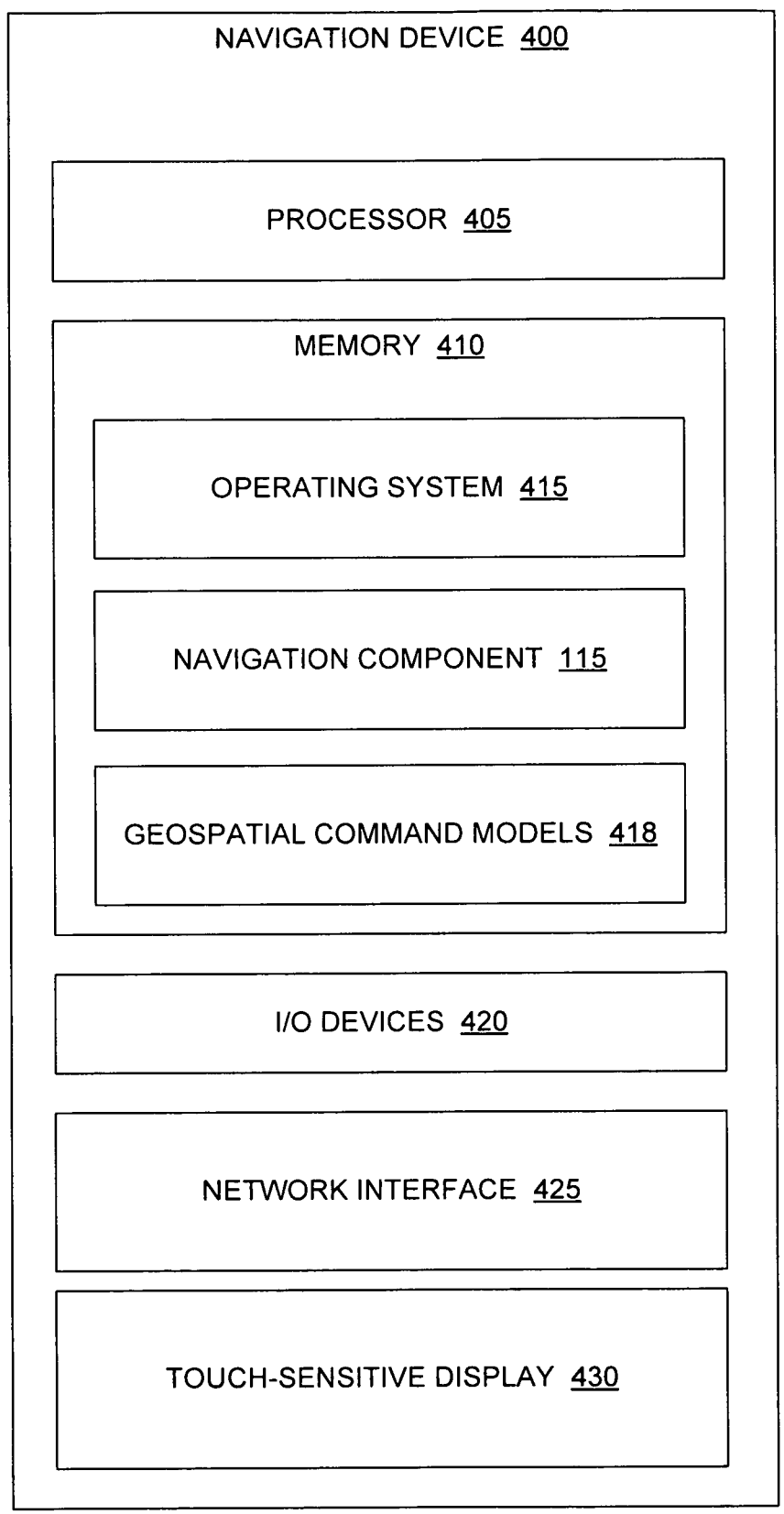
FIG. 4 is a block diagram illustrating the navigation device of FIG. 1, according to various embodiments.

FIG. 4 is a block diagram illustrating the navigation device 100 of FIG. 1, according to various embodiments. As shown, the navigation device 400 includes, without limitation, a processor 405, memory 410, I/O devices 420, a network interface 425 and a touch-sensitive display device 430.

Processor 405 may be any technically feasible form of processing device configured to process data and execute program code. Processor 405 could be, for example, a central processing unit (CPU), a graphics processing unit (GPU), an application-specific integrated circuit (ASIC), a field-programmable gate array (FPGA), and so forth. Processor 405 includes one or more processing cores. In operation, processor 405 is the master processor of computing system 100, controlling and coordinating operations of other system components. Processor 405 executes software applications stored within memory 410 and optionally an operating system (not explicitly shown). In particular, processor 405 executes software and then performs one or more of the functions and operations set forth in the present application.

Generally, the processor 405 retrieves and executes programming instructions stored in the memory 410. Processor 405 is included to be representative of a single CPU, multiple CPUs, a single CPU having multiple processing cores, GPUs having multiple execution paths, and the like. The memory 410 is generally included to be representative of a random access memory. The network interface 425 enables the media player device 400 to connect to a data communications network (e.g., wired Ethernet connection or an 802.11 wireless network). The navigation device 400 may further include a Bluetooth transceiver module for use in communicating with other devices. Further, while the depicted embodiment illustrates the components of a navigation device 400, one of ordinary skill in the art will recognize that embodiments may use a variety of different hardware architectures. Moreover, it is explicitly contemplated that embodiments may be implemented using any device or computer system capable of performing the functions described herein.

The memory 410 represents any memory sufficiently large to hold the necessary programs and data structures. Memory 410 could be one or a combination of memory devices, including Random Access Memory, nonvolatile or backup memory (e.g., programmable or Flash memories, read-only memories, etc.). In addition, memory 410 may be considered to include memory physically located elsewhere; for example, and without limitation, on another computer or device communicatively coupled to the media player device 400. Illustratively, the memory 410 includes an operating system 415, a navigation component 115 and geospatial command models 418. The operating system 415 generally controls the execution of application programs on the media player device 400. Examples of operating system 415 include, without limitation, UNIX, a version of the Microsoft Windows® operating system, and distributions of the Linux® operating system. Additional examples of operating system 415 include, and without limitation, custom operating systems for gaming consoles, including the custom operating systems for systems such as the Nintendo DS® and Sony PSP®, as well as operating systems configured for mobile devices such as Apple iOS®.

The I/O devices 420 represent a wide variety of input and output devices, including displays, keyboards, touch screens, and so on. For instance, the I/O devices 420 may include a set of buttons, switches or other physical device mechanisms for controlling the media player device 400. For example, and without limitation, the I/O devices 420 could include a set of directional buttons used to control aspects of a video game played using the media player device 400. In the context of the present disclosure, the I/O devices 420 can include at least one audio output device configured to project a steerable beam of sound. Examples of such I/O devices 420 include, without limitation, a beam forming speaker array and an actuated directional speaker. More generally, however, any device capable of projecting a directional beam of sound can be used, consistent with the present disclosure. Additionally, as discussed above, some embodiments may project visual content, in addition to or in lieu of an audio projection. For example, and without limitation, such an embodiment could be configured with a steerable micro projector capable of projecting visual content into the physical environment. More generally, however, any device capable of projecting visual content can be used. Moreover, the I/O devices 420 can include a camera device(s) and microphone(s), for use in detecting user actions and for determining a direction the user is located in, relative to the media player device 400. The touch-sensitive display 430 can be used for outputting a graphical user interface for the media player device 400 (e.g., an interface generated by the operating system 415) and can also be used to detect gestures performed by a user of the media player device 400.

As discussed above, the navigation component 115 could identify a user and could determine preference information representing the user's driving and navigation preferences. The navigation component 115 could then generate a geospatial command model representing a respective intended meaning for the user for each of a plurality of geospatial commands. The navigation component 115 could then use the geospatial command model to process user queries that specify one or more geospatial commands. The navigation component 115 can monitor user behavior and feedback to continuously refine the geospatial command model for the user to more accurately match the user's intended meaning for each of the geospatial commands. Additionally, the navigation component 115 can use user profile data for the user to predictively select destinations and routes that best match the user's preferences and intended meaning. Doing so provides an improved interface that enables the user to more naturally converse with the navigation device 400.

Various embodiments may be provided to end users through a cloud computing infrastructure. Cloud computing generally refers to the provision of scalable computing resources as a service over a network. More formally, cloud computing may be defined as a computing capability that provides an abstraction between the computing resource and the underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, the navigation device 400 could be deployed on a node within the cloud and could receive requests (e.g., from another instance of the for the navigation device 400 deployed on a navigation device) specifying a user identified within a physical environment. The navigation device 400 could then access centralized user preference data for the identified user maintained within the cloud computing environment and could generate a refined geospatial command model and user profile for the identified user. Such a refined model and user profile could then be returned responsive to the request. Doing so allows the user preference information to be queried from any computing device attached to a network connected to the cloud (e.g., the Internet).

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A non-transitory computer-readable storage medium including instructions that, when executed by a processor, cause the processor to perform the steps of:
    receiving a request specifying one or more geospatial commands;
    generating a user-specific geospatial command model based on at least one of collected user behavior and feedback data;
    identifying an affinity group model that corresponds to a group of users that share common characteristics with the user-specific geospatial command model;
    modifying the user-specific geospatial command model based on the affinity group model to generate a modified user-specific geospatial command model;
    generating a navigation query based on the one or more geospatial commands and using the modified user-specific geospatial command model; and
    executing the generated navigation query against a navigation database to determine route and destination information.

2. The non-transitory computer-readable medium of claim 1, wherein the collected user behavior and feedback data comprises data describing user navigational preferences.

3. The non-transitory computer-readable medium of claim 2, wherein generating the user-specific geospatial command model comprises:
    generating an initial user-specific geospatial command model;
    transmitting the initial user-specific geospatial command model to a remote server, wherein the remote server is configured to generate the user-specific geospatial command model using supplemental user information; and
    receiving the user-specific geospatial command model from the remote server.

4. The non-transitory computer-readable medium of claim 2, wherein the collected user behavior and feedback data further comprises at least one of: (i) destination history information specifying a plurality of previously visited destinations; (ii) parking preference data indicating a user preference for one or more types of parking; (iii) social media data representing interactions on one or more social media sites; and (iv) driving preference data indicating a preference for one or more types of roads.

5. The non-transitory computer-readable medium of claim 2, wherein the affinity group model is identified based on descriptive user metadata describing a user associated with the collected user behavior and feedback data, the descriptive user metadata comprising at least one of user age information, user geolocation information, and user navigational preference information.

6. The non-transitory computer-readable medium of claim 5, further comprising the step of refining an aspect of the user-specific geospatial command model, based on the collected user behavior and feedback data.

7. The non-transitory computer-readable medium of claim 6, further comprising the step of refining an aspect of the affinity group model based on the refined user-specific geospatial command model.

8. The non-transitory computer-readable medium of claim 1, further comprising the step of determining user profile information describing previously visited destinations and route preferences, wherein generating the navigation query further uses the user profile information to determine the route and destination information.

9. The non-transitory computer-readable medium of claim 1, further comprising the steps of:
presenting a plurality of route and destination options; and
receiving a user selection of one or the plurality of route and destination options for use in creating a current travel plan.

10. The non-transitory computer-readable medium of claim 1, further comprising the step of determining a predicted destination for the navigation query, based on user information.

11. The non-transitory computer-readable medium of claim 10, wherein generating the navigation query comprises determining a distance relative to the determined predicted destination, using the user-specific geospatial command model.

12. A navigation device, comprising:
a memory that includes a navigation component; and
a processor that is coupled to the memory and, upon executing the navigation component, is configured to:
identify one or more geospatial commands;
generate a user-specific geospatial command model based on collected user behavior and feedback data;
identify an affinity group model that corresponds to a group of users that share common characteristics with the user-specific geospatial command model;
modify the user-specific geospatial command model based on the affinity group model to generate a modified user-specific geospatial command model;
generate a navigation query based on the one or more geospatial commands and using the modified user-specific geospatial command model; and
execute the navigation query against a navigation database to determine route and destination information.

13. The navigation device of claim 12, wherein the collected user behavior and feedback data comprises data describing user navigational preferences.

14. The navigation device of claim 13, wherein generating the user-specific geospatial command model comprises:
generating an initial user-specific geospatial command model;
transmitting the initial user-specific geospatial command model to a remote server, wherein the remote server is configured to generate the user-specific geospatial command model using supplemental user information; and
receiving the user-specific geospatial command model from the remote server.

15. The navigation device of claim 13, wherein the collected user behavior and feedback data further comprises at least one of: (i) destination history information specifying a plurality of previously visited destinations; (ii) parking preference data indicating a user preference for one or more types of parking; (iii) social media data representing interactions on one or more social media sites; and (iv) driving preference data indicating a preference for one or more types of roads.

16. The navigation device of claim 13, wherein the affinity group model is identified based on descriptive user metadata describing a user associated with the collected user behavior and feedback data, the descriptive user metadata comprising at least one of user age information, user geolocation information, and user navigational preference information.

17. The navigation device of claim 16, the wherein the processor is further configured to:
refine an aspect of the user-specific geospatial command model, based on the collected user behavior and feedback data; and
refine an aspect of the affinity group model based on the refined user-specific geospatial command model.

18. The navigation device of claim 12, wherein the processor is further configured to determine a predicted destination for the navigation query, based on user information.

19. The navigation device of claim 18, wherein generating the navigation query further comprises determining a distance relative to the determined predicted destination, using the user-specific geospatial command model.

20. A method, comprising:
receiving one or more geospatial commands;
generating, by operation of one or more computer processors, a user-specific geospatial command model;
identifying an affinity group model that corresponds to a group of users that share common characteristics with the user-specific geospatial command model;
modifying the user-specific geospatial command model based on the affinity group model to generate a modified user-specific geospatial command model;
generating a navigation query based on the one or more geospatial commands and using the modified user-specific geospatial command model; and
executing the navigation query to determine route and destination information.

* * * * *